(12) United States Patent
Choi

(10) Patent No.: US 7,480,250 B2
(45) Date of Patent: Jan. 20, 2009

(54) APPARATUS AND METHOD FOR ESTABLISHING NETWORK

(75) Inventor: Dang Woo Choi, Osan-si (KR)

(73) Assignee: LG Electronics Inc., Seoul (KR)

( * ) Notice: Subject to any disclaimer, the term of this patent is extended or adjusted under 35 U.S.C. 154(b) by 573 days.

(21) Appl. No.: 11/106,524

(22) Filed: Apr. 15, 2005

(65) Prior Publication Data

US 2006/0018320 A1    Jan. 26, 2006

(30) Foreign Application Priority Data

Jul. 26, 2004    (KR) .................. 10-2004-0058289

(51) Int. Cl.
*G01R 31/08* (2006.01)
*H04L 12/28* (2006.01)

(52) U.S. Cl. .................... 370/242; 370/395.2

(58) Field of Classification Search .......... 370/392, 370/401, 395.54, 390, 241, 395.3, 242, 395.2
See application file for complete search history.

(56) References Cited

U.S. PATENT DOCUMENTS

| | | | | |
|---|---|---|---|---|
| 5,724,510 | A * | 3/1998 | Arndt et al. ............. | 709/220 |
| 5,854,901 | A * | 12/1998 | Cole et al. .............. | 709/245 |
| 6,130,892 | A * | 10/2000 | Short et al. ............. | 370/401 |
| 6,822,955 | B1 * | 11/2004 | Brothers et al. ......... | 370/389 |
| 6,826,611 | B1 * | 11/2004 | Arndt .................... | 709/226 |
| 7,051,087 | B1 * | 5/2006 | Bahl et al. .............. | 709/220 |
| 7,174,390 | B2 * | 2/2007 | Schulter et al. .......... | 709/245 |
| 7,200,678 | B1 * | 4/2007 | Bettadahalli et al. ..... | 709/245 |
| 2005/0135422 | A1 * | 6/2005 | Yeh ...................... | 370/474 |

FOREIGN PATENT DOCUMENTS

EP    1 204 260 A2    5/2002
WO    WO 2004/017609 A2    2/2004

* cited by examiner

*Primary Examiner*—Kwang B. Yao
*Assistant Examiner*—Candal Elpenord
(74) *Attorney, Agent, or Firm*—Birch, Stewart, Kolasch & Birch, LLP

(57) ABSTRACT

An apparatus and a method for establishing a network by preset IP information when a host is plugged in a network, are provided. The apparatus and the method for establishing a network comprise one or more first hosts with a MAC address and an IP address as established; a second host for storing one or more different network related information as established or stored by a user; an interface unit for performing data send and receive operations through the network; and a unit for enabling a TCP/IP to be automatically established by the stored network related information. The method includes storing two or more TCP/IP Preset# information in a host to join in a network; determining an access priority order by comparing an ARP responded information with the TCP/IP Preset# when the host is plugged in the network and receives the ARP response; broadcasting an ARP request according to the TCP/IP Preset# information by the access priority order; and establishing a network according to the ARP response as received in a unicast mode.

2 Claims, 8 Drawing Sheets

Fig.5

```

# tcpduiap -e arp
ning on eth0
1 0:2:fc:8:c4:a0 Broadcast arp 60:  arp who-has 211.47.67.150 tell 211.47.67.2 ...
1 0:50:8b:9a:2e:a8 Broadcast arp 60:  arp who-has 211.47.65.143 tell 211.4765 ...
1 0:2:fo:8:c4:a0 Broadcast arp 60:  arp who-has 211.47.67.161 tell 211.47.67.2 ...
1 0:2:fc:8:c4:a0 Broadcast arp 60:  arp who-has 211.47.67.224 tell 211.47.67.2 ...
1 0:2:fc:8:c4:a0 Broadcast arp 60:  arp who-has 211.47.67.205 tell 211.47.67.2 ...
1 52:54:5:10:e7:f8 Broadcast arp 60:  arp who-has 211.47.67.187 tall 211.47.67 ...
1 0:2:fc:8:c4:a0 Broadcast arp 60:  arp who-has 211.47.65.250 tell 211.47.65:2 ...
1 0:2:fc:B:c4:a0 Broadcast sip 60:  arp who-has 211.47.67.106 tell 211.47.67.2 ...
1 0:50:8b:9a:2e:a8 Broadcast arp 60:  arp who-has 211.47.65.192 tell 211.47.6S ...   ← 53
1 0:50:Bb:9a:2e:aS 0:50:8b:9a:2a:1 arp 60: arp who-has 211.47.65.192 tell 211 ...
1 0:50:8b:9a:2a:1 0:50:8b:9a:2e:a8 arp 60: arp_reply 211.47.65.192 is-at 0:50 ...   ← 51
1 0:50:8h:9a:2e:a8 Broadcast arp 60:  arp who-has 211.41.65.143 tell 211.47.65 ...
1 0:2:fo:8:c4:a0 Broadcast arp 60:  arp who-has 211.47.67.67 tell 211.47.67.25 ...
1 0:0:0:0:31:70 Broadcast arp 60:  arp who-has 211.47.64.64 tell 211.47.64.71 ...
1 0:2:fc:8:c4:a0 Broadcast arp 60:  arp who-has 211.47.67.150 tell 211.47.67.2 ...
1 52:54:5:f0:e7:f8 Broadcast arp 60:  arp who-has 211.47.67.187 tell 211.47.67 ...
1 0:2:fc:8:c4:a0 Broadcast arp 60:  arp who-has 211.47.65.250 tell 211.47.65.2 ...
1 0:0:f0:51:4:le Broadcast arp 60:  arp who-has 211.47.67.112 tell 211.47.67.1 ...
1 0:0:f0:51:4:le Broadcast arp 60:  asp who-has 211.47.67.119 tell 211.47.67.1 ...
1 0:2:fo:0:c4:a0 Broadcast arp 60:  arp who-has 211.47.65.224 tell 211.47.65.2 ...
1 52:54:5:f0:e7:f6 Broadcast asp 60:  arp who-has 211.47.67.187 tell 211.47.67 ...
1 0:2:fc:8:c4:a0 Broadcast arp 60:  asp who-has 211.47.67.205 tell 211.47.67.2 ...
1 0:2:fc:B:c4:a0 Broadcast arp asp 60:  arp who-has 211.47.67.106 tell 211.47.67.2 ...
1 0:2:fo:B:c4:a0 Broadcast arp 60:  asp who-has 211.47.67.224 tall 211.47.67.2 ...
1 0:50:8b:9a:2e:a8 Broadcast asp 60:  asp who-has 211.47.65.143 tell 211.47.65 ...
1 52:54:5:f0:e7:f8 Broadcast asp 60:  erp who-has 211.47.67.187 tell 211.47.67 ...
1 0:d0:h7:88:ea:4a Broadcast arp 60:  arp who-has 211.47.65.206 tell 211.47.65 ...
1 0:a0:4b:9:c6:72 Broadcast arp 60: arp who-has 211.47.64.254 tell 211.47.64. ...
1 0:2:fc:8:c4:a0 Broadcast asp 60:  arp who-has 211.47.65.250 tell 211.47.65.2 ...
1 0:50:8b:9a:2e:a8 Broadcast asp 60: asp who-has 211.47.65.143 tell 211.47.65 ...
1 0:2:fc:8:c4:a0 Broadcast arp 60:  arp who-has 211.47.67.106 tell 211.47.67.2 ...
1 0:2:fo:8:c4:a0 Broadcast asp 60:  asp who-has 211.47.67.160 tell 211.47.67.2 ...
1 0:e0:7d:7f:31:90 Broadcast arp 60:  asp who-has 211.47.64.168 tell 21147.64 ...
1 0:50:8b:9a:2e:a8 Broadcast arp 60:  asp who-has 211.47.65.143 tell 211.47.65 ...
1 0:2:fc:B:c4:a0 Broadcast asp 60:  asp. who-has 211.47.65.224 tell 211.47.65.2 ...
```

APPARATUS AND METHOD FOR ESTABLISHING NETWORK

This application claims the priority benefit of Patent Application No. 10-2004-058289 filed on Jul. 26, 2004 in Republic of Korea, which is hereby incorporated by reference.

BACKGROUND OF THE INVENTION

1. Field of the Invention

The present invention relates to an apparatus and a method for establishing a network by predetermined IP information when a host is plugged in a wire or wireless network.

2. Discussion of the Related Art

In the conventional art, the 802.3 Ethernet adopts a method for establishing a network by changing a TCP/IP establishment by a place where a cable is plugged in for access.

SUMMARY OF THE INVENTION

An object of the invention is to solve the above and other problems and/or disadvantages associated with the related art and to provide at least the advantages described hereinafter.

Accordingly, one object of the present invention is to solve the problems by providing an apparatus and a method for establishing a network by enabling a corresponding TCP/IP establishment to be automatically performed in accordance with the IP information stored, and simultaneously getting a network cable plugged in, in case where the TCP/IP stored in a user's computer by the user is set.

Another object of the present invention is to provide an apparatus and a method for establishing network, which can search an applicable TCP/IP establishment by using an IP address and a subnet mask, by analyzing a broadcast ARP (address resolution protocol) as received after the media connect (cable plug-in).

Another object of the present invention is to provide an apparatus and a method for establishing a network, which can make and transmit an ARP packet by using the IP address and gateway address of the TCP/IP as stored in the user's computer.

The foregoing and other objects and advantages can be realized by providing an apparatus for establishing a network, comprising: one or more first hosts with a MAC address and an established IP address; a second host for storing two or more different network related information as established or stored by a user; an interface unit for performing a data send and receive operation through the network; and a unit for enabling a network TCP/IP to be automatically established by the related information as established and stored by the user when the second host is plugged in the network. A method thereof comprises according to an aspect of the present invention the steps of storing at least two or more TCP/IP Preset number (#) information in the host to join in the network; determining an access priority order by comparing to ARP responded information of one or more TCP/IP preset#'s when the host is plugged in the network and receives the ARP response; broadcasting an ARP request according to the TCP/IP preset# by the priority order; and establishing the network according to the ARP response as unicatingly received.

A method for establishing a network according to an aspect of the present invention comprises the steps of: storing two or more TCP/IP preset# information in the host to join in the network; determining an access priority order by comparing to ARP responded information of two or more TCP/IP preset#'s when the host is plugged in the network and receives the ARP response; broadcasting an ARP Request according to the TCP/IP preset# information by the priority order; and establishing the network according to the ARP response as unicatingly received.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 shows a captured example that an ARP on a local LAN is actually broadcasting in real time according to the present invention;

DETAILED DESCRIPTION OF PREFERRED EMBODIMENTS

The following detailed description will present an apparatus and a method for establishing a network according to the preferred embodiment(s) of the invention in reference to the accompanying drawings.

When setting a protocol environment in a computer (as a host) using Ethernet, an IP address, a subnet mask, and a default gateway are required. The detailed explanation on these are omitted in this application because these are general technology.

Figure 1:
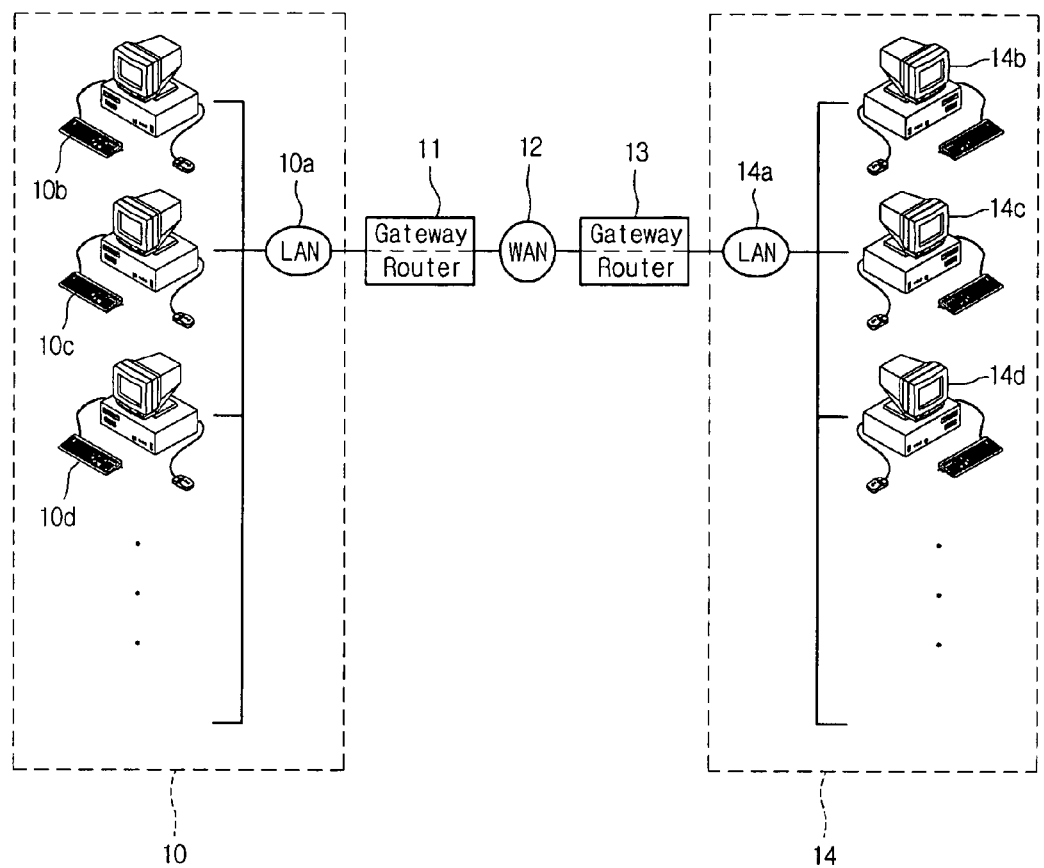
FIG. 1 shows a network for connecting a plurality of hosts with wire and wirelessly according to the present invention.

FIG. 1 shows a network connecting a plurality of hosts according to the present invention.

As shown in FIG. 1, the network includes a first 802.3 Ethernet 10, a second 802.3 Ethernet 14, a communication interface 11 and 13 with a gateway or router, and a wide area network 12 such as the Internet. All the components of the network are operatively coupled.

The first and second Ethernets 10 and 14 are provided with a LAN 10a and 14a and a plurality of hosts (computers) 10b, 10c and 10d; 14b, 14c and 14d.

Figure 2:
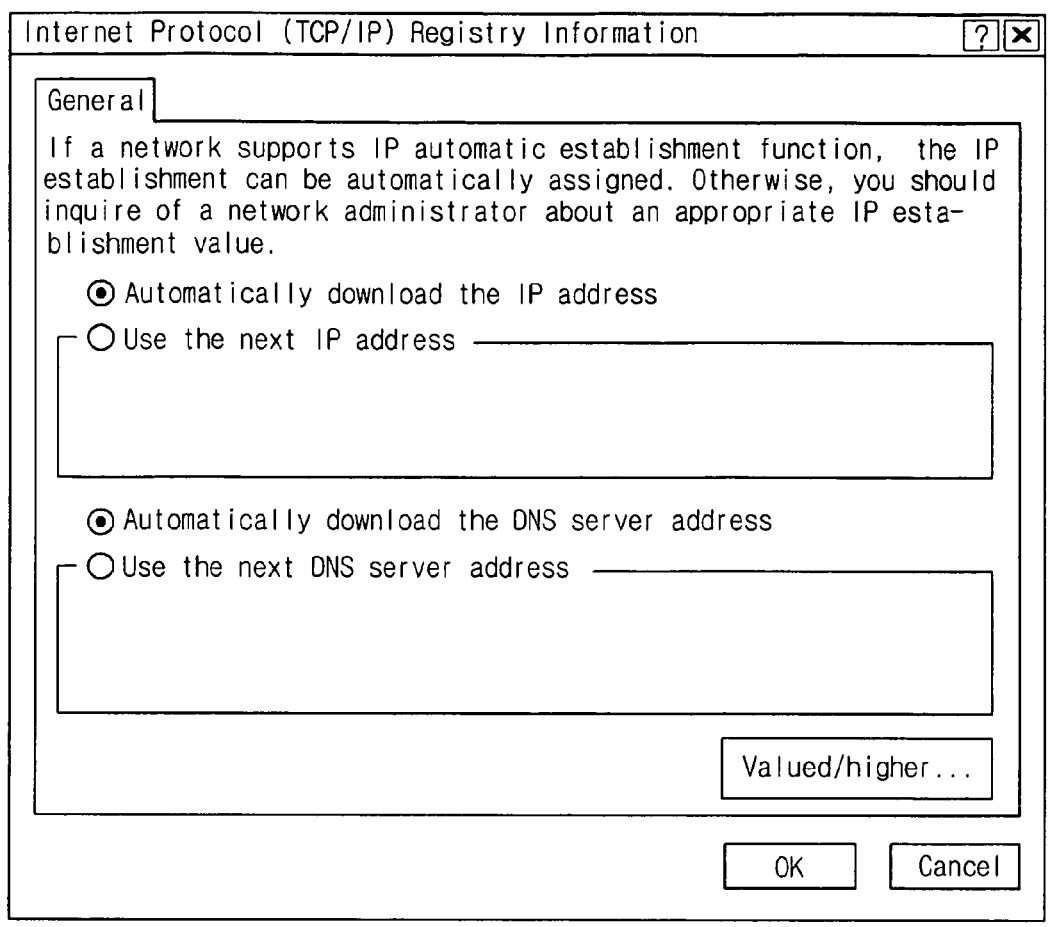
FIG. 2 shows the registry information of the general network protocol (TCP/IP) stored in each host as shown in FIG. 1.

FIG. 2 shows an example of a registry information window of Internet protocol (TCP/IP) in a DHCP (Dynamic Host Configuration Protocol) mode when being stored in each host of FIG. 1.

As show in FIG. 2, when a host is plugged in a particular network, it is set such that IP related information is automatically downloaded. Accordingly, whenever the host is connected to the network, a random IP address can be downloaded. As a result, the IP address can be variably set.

Figure 3:
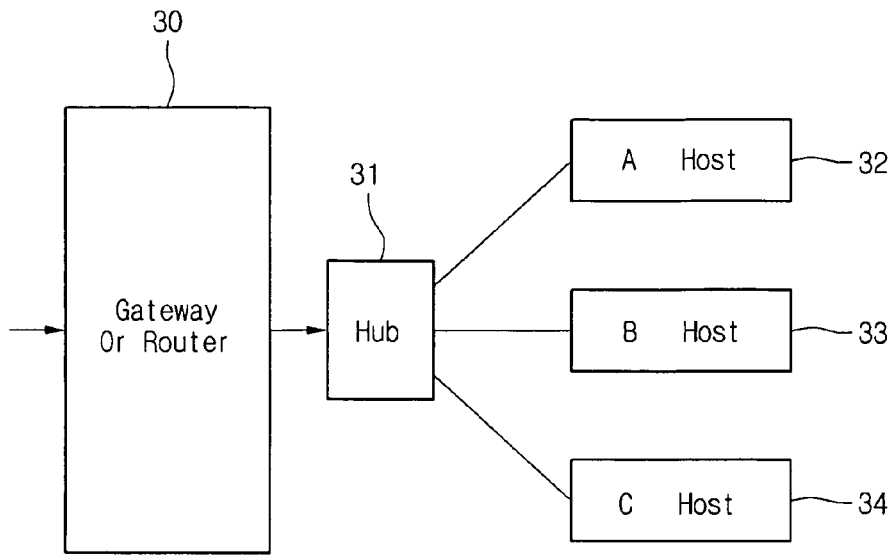
FIG. 3 is a network configuration illustrating a communication principle in the network of FIG. 1 according to the present invention.

FIG. 3 is a simplified network configuration illustrating a communication principle in a network such as the network of FIG. 1.

As shown in FIG. 3, the network includes a communication interface 30 with a gateway or router having each address information, one or more hosts 32, 33, and 34 having IP and MAC (Media Access Control) addresses, respectively, and a hub 31 provided between the communication interface and the hosts. MAC or hardware address is a unique address usable even outside the local network (gateway).

Below is a description of an address resolution protocol (ARP) according to the present invention.

In general, a data frame to be transmitted through the network shall have the MAC address as a physical address of a network card, in addition to the IP address of a destination computer.

Therefore, an ARP is a protocol to identify the MAC address (hardware address) of the destination from the IP address of the destination when the IP address of the destination computer is known but the MAC address of the destination is unknown. Namely, the ARP for converting the IP address into a hardware address such as Ethernet address is the protocol used to correspond the IP address on the IP network to the physical network address. Here, the physical network address means the address of the Ethernet or token ring 48 bits network card.

For example, according to the present invention, if the physical network address (hardware address) of the IP host B (33) is unknown when an IP host A (32) intends to transmit an IP packet to the IP host B, an ARP packet having the IP address destination B and the broadcasting physical network address FF:FF:FF:FF:FF:FF is transmitted on the network, using an ARP protocol. At this time, if any one of the IP host B or hosts on other network know the physical network address of the destination B, this address of the host B is notified to the host A. If its own IP address receives the ARP packet existing in the destination, its own physical network address is responded to the host A.

Figure 4:
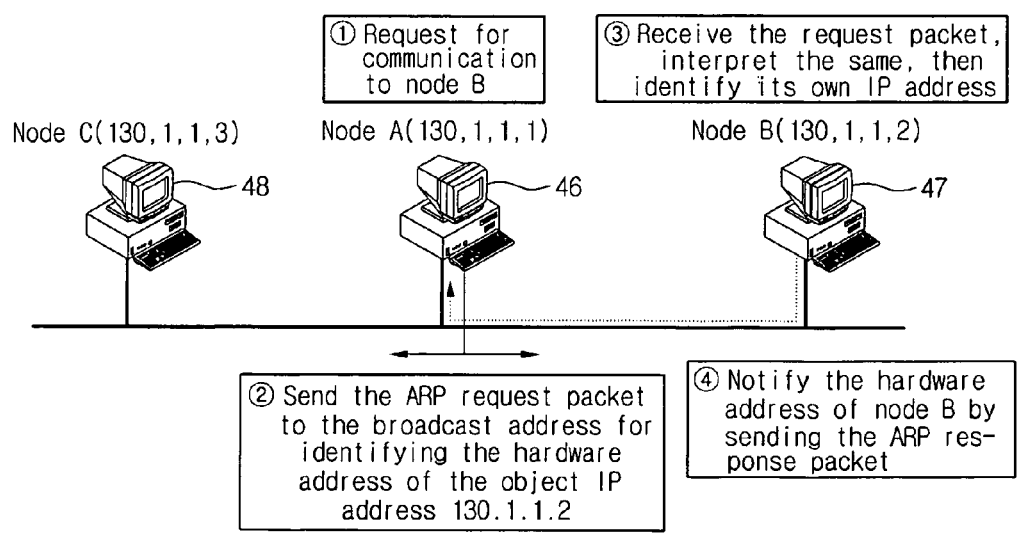
FIG. 4 is an example of a state view illustrating an ARP request and an ARP response among the hosts of FIG. 3 according to the present invention.

FIG. 4 is a state view illustrating an ARP request and an ARP response among the hosts connected to each other via the network according to the present invention. These steps can be implemented in the network of FIGS. 1 and 3 or other suitable networks.

As shown in FIG. 4, a node A46 attempts to connect with a node B47 (①). The node A broadcasts an ARP request packet having the information of the IP address (130.1.1.2) of the node B so as to identify the MAC address (as a hardware address) of the node B (②). Nodes 47 and 48 in the same segment receive the broadcast ARP request packet (requesting the MAC address) and analyze the contents. If the requested information is available, the node B corresponding to the target IP address returns the ARP response packet to the node A to inform the MAC address (hardware address) of the node B. In this regard, instead of the node B, other nodes such as the node C48 can inform the node A46 of the Mac address of the node B (③ and ④).

Then, it is possible for the node A to communicate with the node B since the hardware address of the node B is known from the IP address by the ARP response and request packets.

FIG. 5 shows a captured example of an ARP log on a local LAN, which is being broadcast in real time according to the present invention.

As shown in FIG. 5, an ARP who-has as an ARP request is broadcast to all hosts in the network, whereas an ARP response (ARP reply) is unicast, i.e., a response is sent to a requester. For instance, as shown in FIG. 5, an "ARP who-has" request 53 is broadcast on the network. Then a host who has the answer sends a reply 51 to the requester. In this example, the "ARP who-has" request 53 asks for the MAC/hardware address corresponding to the IP address of "211, 47, 65, 192." The reply 51 then identifies the requested MAC/hardware address.

Figure 6:
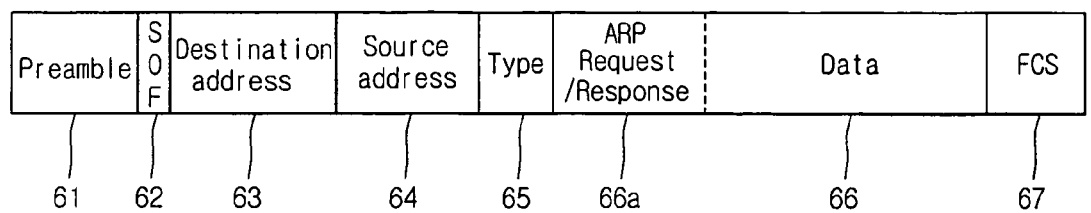
FIG. 6 is a frame format for displaying a packet type as sent and received upon the ARP request and response according to the present invention.

FIG. 6 is a frame format illustrating a packet mode as sent and received upon the ARP request and response according to the present invention.

As shown in FIG. 6, the frame includes a 7-byte preamble 61, a 1-byte SOF (Start Of Frame) 62, a 6-byte destination address 63, and a 6-byte source address 64. The high 3 bytes of the 6 bytes are defined in an IANA as a number for identifying a vendor of Ethernet NIC (Network Interface Card) and the low 3 bytes are defined by each vendor. While the source address is always a unicast (single node) address, the destination address can be the unicast, multicast or broadcast address.

The frame further includes a 2-byte type 65, 46 to 1500-byte data 66, and a 4-byte FCS (Frame Check Sequence) 67. An ARP response/request 66a is included in the data 66.

The basic concept of the present invention can be described as follows.

The basic concept of the present invention is to provide an automatic switching function to automatically use a network by identifying and applying a TCP/IP preset to be used in the plug-in network among two or more TCP/IP presets as prestored when a LAN cable of 802.3 Ethernet is plugged in. TCP/IP presets are sets of addresses and data, each set for a different network, and are prestored in a user's computer (e.g., Host 3 in FIG. 9) to be used for a network connection. That is, in case there exists the TCP/IP preset of a host as pre-used and/or stored by a user, the corresponding TCP/IP is automatically set at the same time as soon as the network cable is plugged in.

In an embodiment, when a current user's computer (e.g., Host 3) is switched on (plugged in to a current network system), the user's computer (Host 3) is configured to automatically download the IP address of the current network as shown in the window of FIG. 2, so as to make a connection to the current network by the automatically downloaded address. If this fails, then the user's computer automatically switches (automatic switching function) to another mode to make a connection to the current network. In this mode, the user's device is configured to use a plurality of network information sets (e.g., IP address, subnet and gateway address) corresponding respectively to different networks.

The implementation to embody this automatic switching function is stated as follows.

A broadcast packet (e.g., ARP packet) is received even though an IP, subnet mask or gateway (which is not proper) may be set in the connected network.

Figure 9:
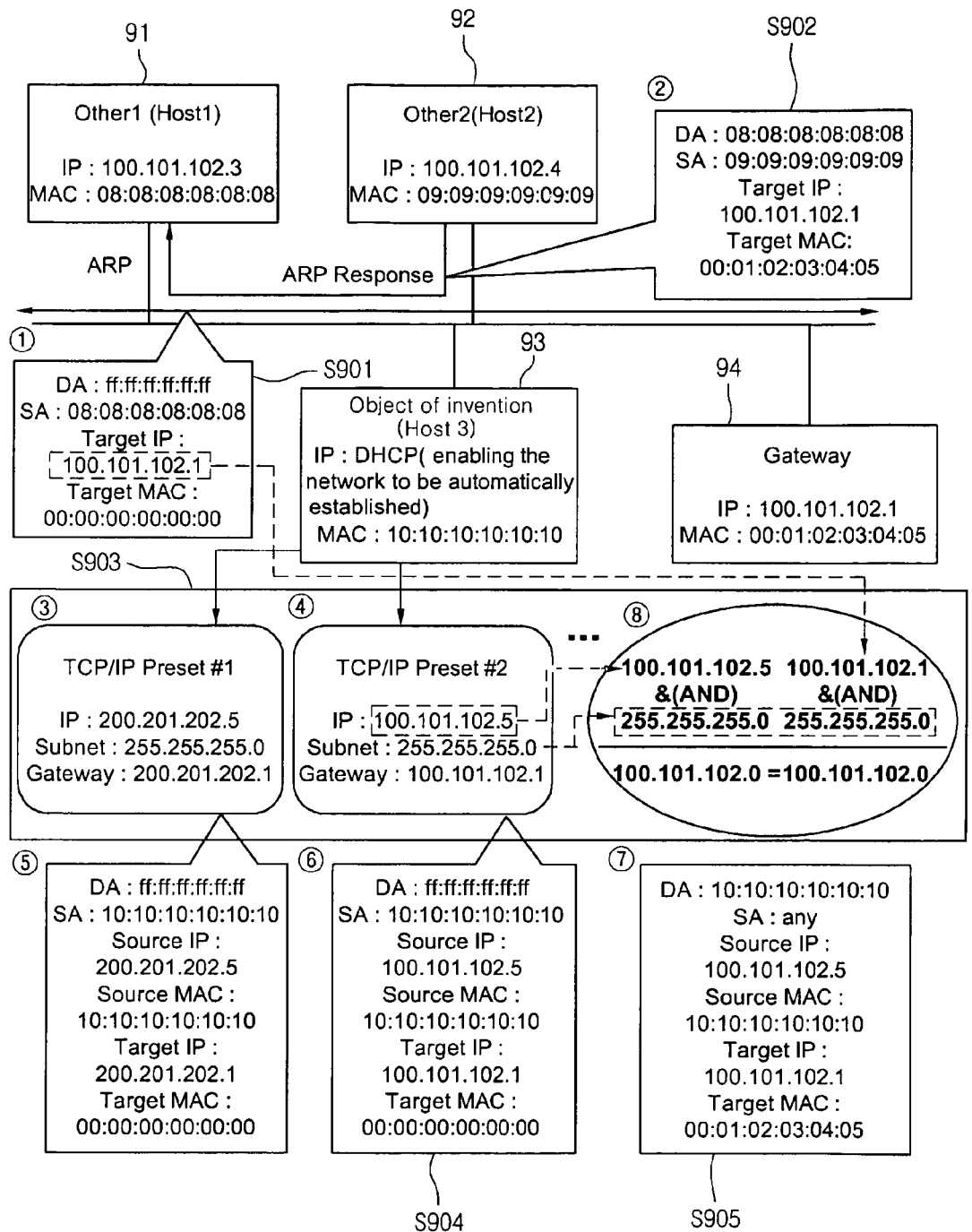
FIG. 9 is a block diagram illustrating that a network is established by switching according to the ARP request and response and the IP information predetermined by the user according to the present invention.

If two or more TCP/IP presets (e.g., TCP/IP Preset #1, TCP/IP Preset #2, . . . in FIG. 9) are stored in the user's device, the most proper setting through the process such as ⑧ in FIG. 9 is performed for each TCP/IP Preset# to find out a relevant TCP/IP Preset# among the presets when the ARP packet is received in the connected network, and to identify whether the preset as found is applicable to the network and to set an additional preset as needed.

If even one ARP packet is found when the LAN cable is plugged in (i.e., to the network connector), access priority order is fixed with a TCP/IP preset (which is most close to the ARP packet as found) having the highest priority. Here, the priority order is an order in which the stored TCP/IP presets are compared with the ARP packet information/requested network information.

If a particular TCP/IP preset is selected from the process ⑧ in FIG. 9 to have the information closest to the ARP packet/requested network information, then optionally, the user's computer generates and broadcasts a random/test ARP packet carrying the selected TCP/IP preset information. If an ARP response to the random ARP packet is received, then it confirms that he selected TCP/IP preset information is viable and uses it to connect to the network. Here the ARP response identifies the MAC address of the network. That is, to verify the applicability/accuracy of the selected TCP/IP preset (for example, Preset#2) obtained from the process ⑧ in FIG. 9, a driver or application makes out a random ARP packet (⑥ in FIG. 9) on the basis of the following information and transmits the same:

The DA (Destination Address) of the random ARP packet is ff:ff:ff:ff:ff:ff (Broadcast).

The SA (Source Address) of the random ARP packet is its own MAC address.

The MAC address to receive the random ARP packet response is set as its own MAC address.

To obtain the MAC address of the gateway (94), the ARP test packet has the gateway IP address used in the corresponding TCP/IP Preset.

In the above, the reason that the IP address to be applied, i.e., target IP address (instead of its own present IP address) is recorded in the ARP request packet is that the ARP packet response cannot be received during the actual use of the IP address when the IP address to be used is set.

That is, if the ARP packet response cannot be received because the IP address to be applied is used, it is impossible to use the network because of the collision between the IP addresses even if the set of the IP address being used is applied. Then, an application of the TCP/IP set is meaningless.

Therefore, if the ARP packet response is received for the ARP request to identify the applicability/accuracy of the selected TCP/IP set, this means that the gateway of the attempted TCP/IP set exists in the connected network and the selected TCP/IP set can then be applied and used to connect to the network by the user (Host 3).

Meanwhile, if there is no response for some time to the ARP request/test packet carrying the IP information to be used, a next TCP/IP Preset is used in an attempt to establish a network connection.

Figure 7:
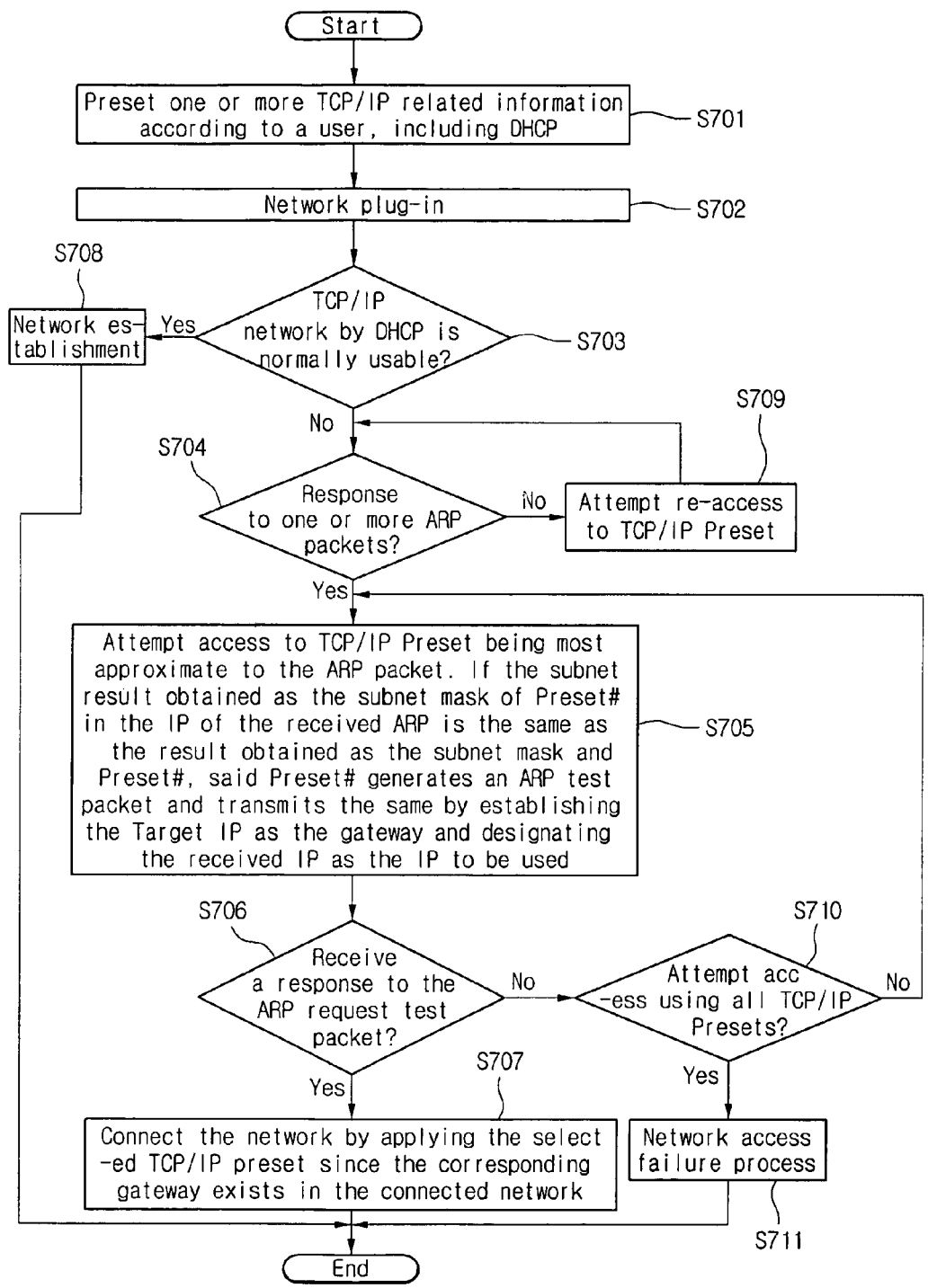
FIG. 7 is a first flow chart illustrating that a network is established by the TCP/IP preset# information as predetermined by a user according to the present invention.

Below is a description of the operation when the LAN cable is plugged in referring to FIG. 7. FIG. 7 is a flow chart illustrating that a network is established by the information of TCP/IP Preset number (#) as preset by a user according to the present invention.

Referring to FIGS. 7 and 9, one or more TCP/IP Preset#'s, including the TCP/IP DHCP, are set in the user's device (for example, Host 3 (93) in FIG. 9) coupled to the network. (S701).

If the Host 3 is plugged in to the network, the Host 3 identifies whether the TCP/IP set by the DHCP is normally usable (S702 and S703).

If the network can be established by the DHCP, the user can connect to and use the network thereof (S703).

However, if the network establishment is not available by the DHCP at the step S703, an ARP request is performed by using the hosts (Hosts 1 and 2 (91 and 92) in FIG. 9) already joined in the network or the information of the TCP/IP Preset# 1, 2 set by the user (Host 31 93) in FIG. 9), whereby it is determined whether the ARP response to the ARP request is received (S704).

If the ARP broadcast is received from other host (Host 1 or 2), a TCP/IP preset, which is most close to the ARP broadcast information, is first used to attempt to connect to the network (S705). That is, broadcast accessibility and the access priority order are determined based on the received ARP information and the TCP/IP information of each TCP/IP Preset# through the process ⑧ of FIG. 9.

For instance, each TCP/IP Preset# is compared with the IP information in the received ARP response to identify the closest TCP/IP Preset. A network connection attempt is made using the TCP/IP preset in which the received IP address of the ARP packet (at the step S704) and the subnet result obtained therefrom are the same as, or closest to, the IP of the TCP/IP Preset# and the subnet result obtained as the subnet mask. In the example of FIG. 9, TCP/IP Preset #2 is determined to have the closest network information to the network information carried in the received ARP broadcast at the step S704.

As to TCP/IP Preset#2 selected from the step S705, prior to the TCP/IP set, the ARP request/test broadcasting is performed to identify whether it is actually possible to access the network using the Preset #2. Then it is identified whether the ARP response is received to the ARP request/test (S706).

If the ARP response is received as a result of the determining step S706, the IP information of TCP/IP Preset#2 is applied to use it in the network connection since it confirms that the gateway corresponding to Preset #2 exists and the IP is usable (S707).

That is, if the response to the ARP packet is received at the step S706, the corresponding gateway exists in the connected network. So, it is possible to connect to the network by applying the selected TCP/IP preset.

If the ARP response is not received as a result of the determining step S704, the access operation is repeatedly performed by using the information of other TCP/IP Preset# (S709).

If the ARP response is not received as a result of the determining step S706, the ARP request/test packet generation is repeatedly performed by using the information of other TCP/IP Preset#'s as set by the user (S710, S705 and S706 repeated). If the ARP response is not received even after all the presets are used, then a network access failure is processed (S710 and S711).

The ARP request packet at the step S706 is generated by the IP address to be used by the packet and the IP address of the gateway.

Figure 8:
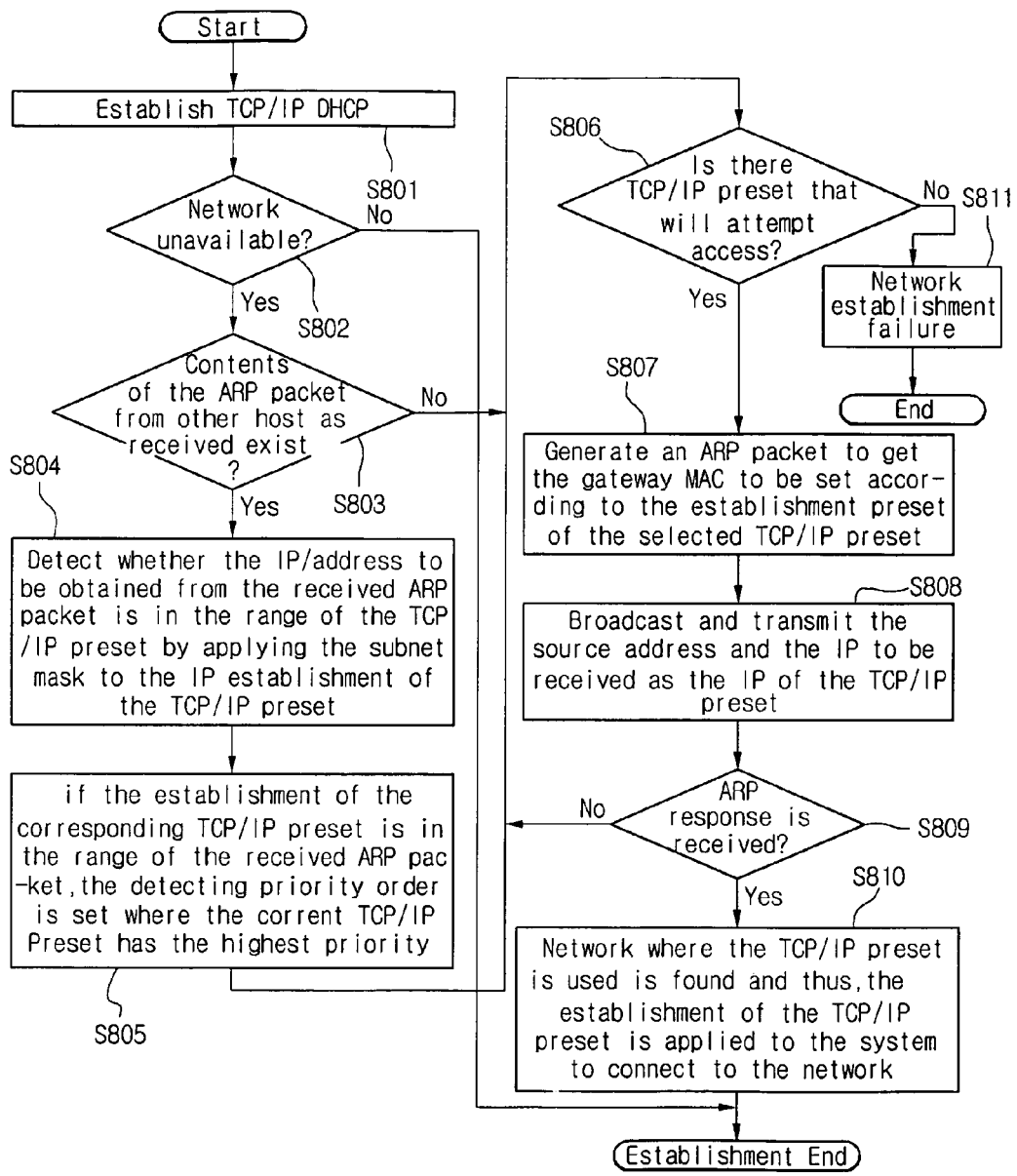
FIG. 8 is a second flow chart illustrating that a network is established by the TCP/IP preset# information as predetermined by the user according to the present invention.

FIG. 8 is a flow chart illustrating that a network is established by the information of the TCP/IP Preset# as preset by a user according to the present invention. That is, it is the algorithm for automatically identifying the TCP/IP set and applying the same after a media connect event (LAN cable plug-in).

Refers to FIGS. 8 and 9, the TCP/IP of the host (93 in FIG. 9) is set as TCP/IP DHCP (S801).

In case the network is normally used by the DHCP, if the network is established but cannot be accessed (S802), it is determined by the host 93 whether the contents of the ARP packet (e.g. ①in FIG. 9) as received from the other host (91 or 92 in FIG. 9) already joined or connected in the network exists (S803).

If the ARP packet ① exists as a result of the determining at the step of S803, it detects whether or not the IP address (Target IP) from the received ARP packet falls within the range of the prestored TCP/IP preset(s) (⑧ in FIG. 9), by comparing the IP information and the subnet mask of the ARP packet to those of the TCP/IP presets (S804).

If a particular TCP/IP preset falls within the acceptable range of the received ARP packet information, the detection priority order is set where the highest priority is given to the Preset#2 in the example of FIG. 9 and it determines whether the TCP/IP preset can attempt access to the network (S805, S806).

If so, an ARP packet to obtain the gateway MAC address to be set is generated based on the contents of the TCP/IP Preset #2 (S807). The source address and the IP to be received are broadcast using the IP of the TCP/IP preset #2 (⑥ in FIG. 9) (S808).

If the ARP response (⑦ in FIG. 9) to ⑥ in FIG. 9 is received according to the step of S808, this means a network where the TCP/IP Preset #2 is used is found. Thus, the establishment of the TCP/IP preset (Preset#2 in FIG. 9) is applied to the system (S810) for the network connection.

If the TCP/IP preset to attempt access does not exist or the ARP response is not continuously received according to the steps of S806 and S809, the network establishment attempt is processed as a failure (S811).

One reason for generating the second ARP request and response in FIGS. 7 and 8 is to identify whether the correct gateway exists and whether the obtained IP is usable. It is possible to omit this process according to the user's establishment and to immediately attempt access.

Hereinafter, a detailed description is given with reference to the embodiment(s).

FIG. 9 is a block diagram illustrating that a network is established by a switching according to the ARP request/response according to the present invention and the IP information as preset by a user.

As shown in FIG. 9, the network includes one or more Hosts 1, 2 (91 and 92) already joined in the network, Host 3 (93) having the information of TCP/IP Preset #1 or #2 and attempting to join in the network, and a gateway 94 in charge of the communication interface.

In case an ARP request broadcast by Host 1 (91) already joined in the network is received by Host 3 (93) at the moment that Preset #1 or Preset #2 is used in an attempt to join in the network, if the subnet result are obtained by the target IP of the received ARP request with a subnet mask (255.255.255.0) and the IP of preset #1, 2 with said subnet mask are the same, the network establishment using the preset is applied to the system to join in the network (Process ⑧ S901, S903).

In FIG. 9, Host 1 (91) can generate and broadcast an ARP request packet to get the MAC address for the network connection as in ① at S901. In response, Host 2 (92) can generate and transmit an ARP response packet carrying the target MAC address back to Host 1 as in ② at S902. That is, transmission and receipt of ARP request/response packets can be carried continuously among the hosts connected to or attempting to connect to a current network. The use of the TCP/IP presets occurs during this process and using such packets. The ARP packet request of Host 1 (91) at the step of S901 is by a broadcast mode, and Host 2 (92) in response is by a unicast mode (S902).

The process ⑧ at S903 is performed for TCP/IP Preset #1, 2 as established by the user, respectively, to determine the accessibility and the access priority order.

Process ⑤ in FIG. 9 is the ARP request packet for Preset #1, ⑥ is the ARP request packet for Preset #2, and ⑦ is the ARP response to the ARP request of Preset #2.

The ARP request is transmitted by the broadcast mode like ⑥ for the information of TCP/IP Preset #2 determined as being accessible by the step S903 (S904), and the ARP response is received in a unicast manner ⑦ (S905).

As described above, the present invention is directed to an apparatus and a method for automatically joining in the network by once again identifying whether the network establishment of a preset is possible and applying the network establishment to a system if the ARP request of other host(s) already joined in the network is received when Preset #1 or #2 (or other #s) is used to join in the network. It includes storing the information of one or more TCP/IP Preset #1, #2 as established by the user, and if the IP of the received ARP request of other host(s) and the subnet result obtained as the subnet mask of Preset #1, #2 as preset are the same as the IP of Preset #1, #2 and the result obtained as the subnet mask.

Accordingly, the present invention enables the plug and play of the network by applying the establishment to be most appropriately used, among the TCP/IP items as preset, without any manual entry/establishment of the TCP/IP.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of connecting a device to a network, comprising:
    presetting a plurality of TCP/IP addresses in the device;
    plugging the device into the network;
    determining whether any of the preset TCP/IP addresses are usable on the network;
    if the preset TCP/IP addresses are not usable, performing an address resolution protocol (ARP) request with at least one other device connected to the network or with another device having an address preset in the device;
    receiving an ARP response to the ARP request from a correspondent device, the correspondent device corresponding to one of the at least one other device and the another device;
    determining whether it is possible to access the network with a preset TCP/IP address closest to a TCP/IP address included in the ARP response;
    if access to the network is possible with the preset TCP/IP address closest to a TCP/IP address included in the ARP response, establishing a network connection;
    if access to the network is not possible with the preset TCP/IP address closest to a TCP/IP address included in the ARP response, determining whether it is possible to access the network with another preset TCP/IP address;

if access to the network is possible with the another preset TCP/IP address, establishing the network connection; and if access to the network is not possible with any preset TCP/IP address, indicating that a network connection attempt has failed.

2. A method of establishing a connection of a device to a network, comprising:

presetting a plurality of TCP/IP addresses in the device;

plugging the device into the network;

determining whether the network is available to the device;

if the network is not available, determining whether an address resolution protocol (ARP) packet from another device already connected to the network has been received by the device;

if the ARP packet from the another device has been received by the device, determining whether a TCP/IP address within the received ARP packet falls within a range of preset TCP/IP addresses;

if the TCP/IP address within the received ARP packet falls within the range of preset TCP/IP addresses, establishing a detection priority order where a preset TCP/IP address closest to the TCP/IP address within the ARP packet is given a highest priority;

performing an ARP request process with at least one other device connected to the network or with another device with preset TCP/IP addresses in accordance with the detection priority order;

receiving an ARP response to the ARP request process from a correspondent device, the correspondent device corresponding to one of the at least one other device and the another device;

determining whether it is possible to access the network by the device with a preset TCP/IP address closest to a TCP/IP address included in the ARP response;

if access to the network is possible with the preset TCP/IP address closest to a TCP/IP address included in the ARP response, establishing a network connection;

if access to the network is not possible with the preset TCP/IP address closest to a TCP/IP address included in the ARP response, determining whether it is possible to access the network with another preset TCP/IP address;

if access to the network is possible with the another preset TCP/IP address, establishing the network connection; and if access to the network is not possible with any preset TCP/IP address, indicating that a network connection attempt has failed.

* * * * *